US006935944B2

(12) United States Patent
Bigelow, Jr.

(10) Patent No.: US 6,935,944 B2
(45) Date of Patent: Aug. 30, 2005

(54) AIR SYSTEMS FOR VEHICLES

(76) Inventor: Floyd E. Bigelow, Jr., 18003 Spellbrook, Houston, TX (US) 77084

( * ) Notice: Subject to any disclaimer, the term of this patent is extended or adjusted under 35 U.S.C. 154(b) by 174 days.

(21) Appl. No.: 10/713,413

(22) Filed: Nov. 15, 2003

(65) Prior Publication Data
US 2005/0107026 A1   May 19, 2005

(51) Int. Cl.[7] .................................................. B60H 1/24
(52) U.S. Cl. ..................................... 454/143; 454/370
(58) Field of Search .......................... 454/84, 143, 151, 454/338, 370

(56) References Cited

U.S. PATENT DOCUMENTS

| 3,200,731 | A | * | 8/1965 | Hart, Jr. ...................... 454/228 |
| 4,687,414 | A | * | 8/1987 | Wardy .......................... 416/63 |
| 4,799,858 | A |   | 1/1989 | Shin-Chin .................... 416/110 |
| 4,850,804 | A |   | 7/1989 | Huang ........................ 416/246 |
| 4,854,579 | A |   | 8/1989 | Baxter ........................ 273/324 |
| 5,112,535 | A |   | 5/1992 | Roberson ..................... 261/27 |
| 5,547,343 | A |   | 8/1996 | Jane et al. ................... 416/246 |
| 5,613,371 | A |   | 3/1997 | Nelson ........................ 62/244 |
| 5,725,062 | A |   | 3/1998 | Fronek ....................... 180/2.2 |
| 5,934,349 | A | * | 8/1999 | Faller ......................... 160/127 |
| 5,983,518 | A | * | 11/1999 | Ellenburg .................... 34/106 |
| 6,158,140 | A |   | 12/2000 | Orr ............................. 34/62 |
| 6,202,394 | B1 |  | 3/2001 | Russ ............................ 56/1 |
| 6,220,647 | B1 |  | 4/2001 | Winkler ................. 296/100.14 |
| 6,325,362 | B1 |  | 12/2001 | Massey et al. .............. 261/127 |
| 6,422,030 | B1 |  | 7/2002 | Calvert ....................... 62/314 |
| 6,435,293 | B1 |  | 8/2002 | Williams .................. 180/65.1 |
| 6,481,642 | B1 |  | 11/2002 | Louis, Jr. et al. ........... 239/152 |

* cited by examiner

Primary Examiner—Harold Joyce
(74) Attorney, Agent, or Firm—Guy McClung

(57) ABSTRACT

A vehicle with an air system for directing a flow of air at the rear of a head and/or neck of a person occupying the vehicle and/or for directing a flow of air to a space under a roof or canopy of the vehicle to dissipate hot air beneath the roof or canopy.

10 Claims, 2 Drawing Sheets

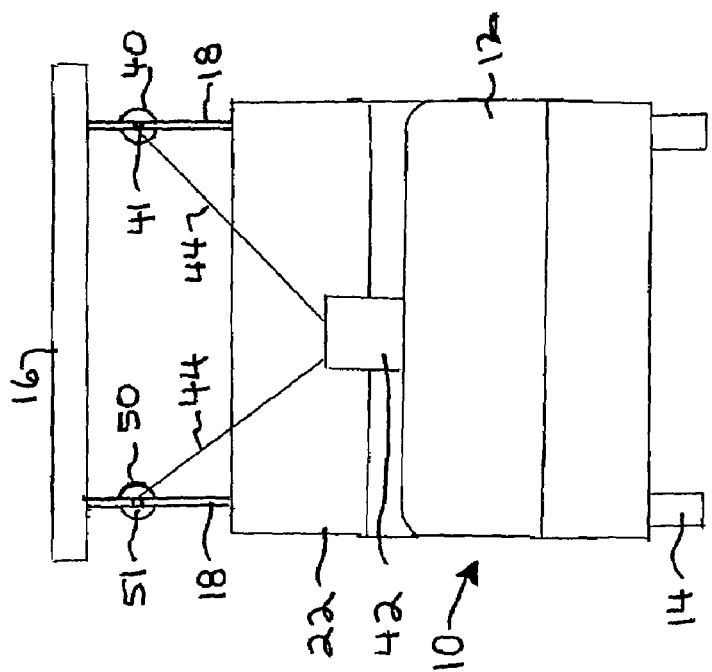
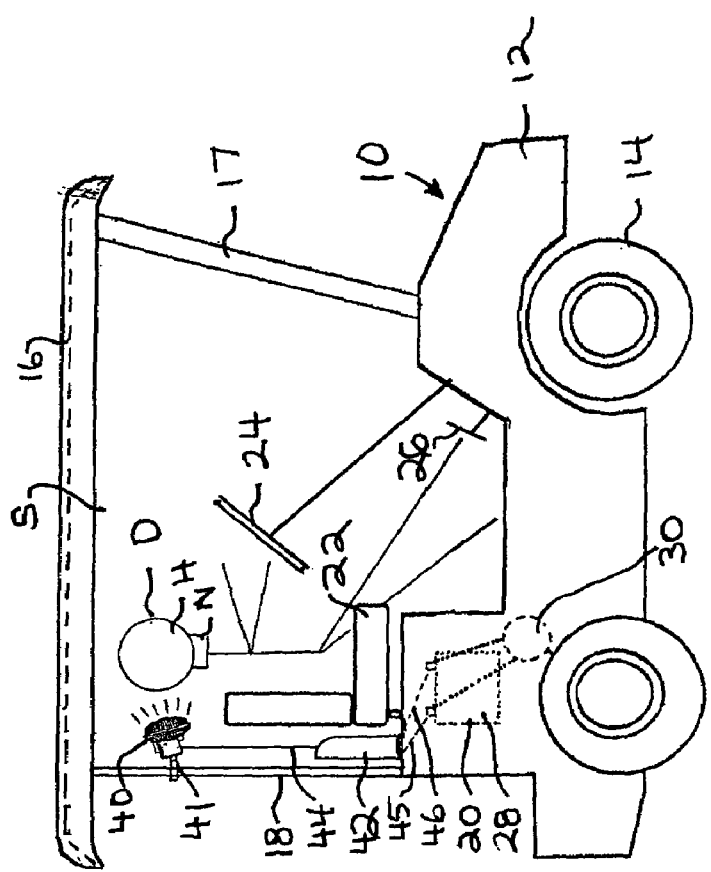

US 6,935,944 B2

AIR SYSTEMS FOR VEHICLES

BACKGROUND OF THE INVENTION

1. Field of the Invention

The present invention is directed to golf carts, riding lawnmowers, machinery, and similar vehicles; to such vehicles with an air movement system for the comfort of persons operating or being transported by the vehicles; and to methods for providing for the comfort of such persons.

2. Description of Related Art

The prior art reveals a variety of vehicles such as golf carts, riding lawnmowers, machinery and similar vehicles and a variety of systems for heating and/or cooling persons driving or being transported by such vehicles. In many environments, persons on such vehicles are subjected to a hot climate and, often, to severe heat which limits their activity. Also, many of these vehicles have a canopy or roof that not only transmits and conveys heat to the vehicle's occupants, but also traps heat above and around the heads and necks of the occupants.

The prior art discloses a variety of portable fans and heaters, many with fixtures or apparatuses for selectively mounting them on any suitable support. Many of these fans and heaters have adjustable mounting apparatus so that they may be directed in any chosen direction. Representative devices are shown in U.S. Pat. Nos. 5,547,343; 4,850,804; and 4,799,850 [all fully incorporated herein for all purposes] and in the prior art cited in these patents.

U.S. Pat. Nos. 6,435,292; 6,325,362; 6,202,394; 6,158,140; 5,613,371; 4,899,931; and 5,112,535 disclose typical prior art vehicles with air systems and all of these patents are incorporated fully herein for all purposes.

There is a need, recognized by the present inventor, for a vehicle that dissipates heat around and above the heads of occupants of the vehicle.

SUMMARY OF THE PRESENT INVENTION

The present invention, in at least certain aspects, provides a vehicle that has at least one air provider, e.g. an air blower or fan, that is positionable on the vehicle so that it can direct a flow of air at the rear of a person's head and/or neck. Optionally, the flow of air can be directed toward a space beneath a roof or canopy of a vehicle to dissipate hot air beneath the roof or canopy. In one particular aspect, two spaced-apart air suppliers or fans are used to create a turbulent air flow to dissipate such hot air.

In one embodiment of a vehicle with an air system according to the present invention, one or more air suppliers or fans are mounted beneath a roof or canopy that has one or more openings therethrough and the opening(s) extend in a direction along the roof, in one aspect generally parallel to a length of the vehicle (in one aspect, from one end of the roof or canopy to the other). In one embodiment, the air suppliers or fan(s) are positioned so that they direct air flow in the general direction of the direction in which the opening (s) extend so that the opening(s) minimally impede the air flow.

Optionally, part of a roof or canopy as described above is made of insulating material and/or insulating material is added to a roof or canopy to further alleviate the effects of the transmission of heat by a roof or canopy.

In certain embodiments of the present invention one or more air suppliers or fans are mounted at the rear of a vehicle so that it or they do not obscure the forward and side view of occupants of the vehicle.

In certain aspects one, two, or more air suppliers or fans are provided in a portable kit that includes mounting apparatus for the air suppliers or fan(s) and, optionally, a self-contained power supply, e.g., but not limited to one or more batteries and/or solar power systems for running the air suppliers or fan(s).

In certain embodiments, the air suppliers or fan(s) of systems according to the present invention use the power supply of the vehicle on which the air suppliers or fan(s) are mounted and/or have their own dedicated power supply.

It is, therefore, an object of at least certain preferred embodiments of the present invention to provide:

New, useful, unique, efficient, non-obvious vehicles with air systems for providing for the comfort of occupants of the vehicles and new, useful, unique, efficient, non-obvious air systems for such vehicles;

Such vehicles and air systems which dissipate or eliminate hot air accumulated beneath a roof or canopy of a vehicle;

Such vehicles and air systems which direct an air flow at the rear of a person's head and/or neck area;

Such vehicles with a roof or canopy with one or more openings through which air can flow;

Such vehicles with one or more openings that extend in a direction and which have an air system that directs air in the general direction of the direction of the opening (s).

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 1A is a side view of a vehicle according to the present invention. FIG. 1B is an end view of the vehicle of FIG. 1A.

DESCRIPTION OF EMBODIMENTS PREFERRED AT THE TIME OF FILING FOR THIS PATENT

Figure 2:
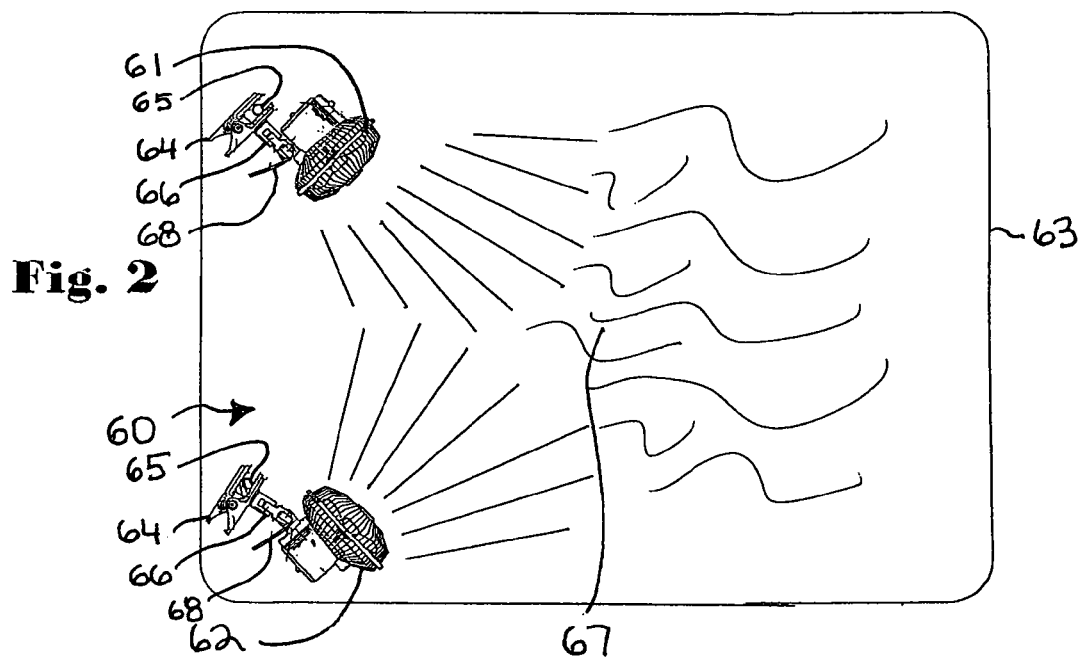
FIG. 2 is a top view of an air system according to the present invention.

FIGS. 1A and 1B shows a vehicle 10 according to the present invention which has a vehicle body 12, from rotatable tires 14, a roof 16, front roof supports 17, and rear roof supports 18. A driver D with a head H and a neck N sits on a seal 22; steers the vehicle with a steering wheel 24; and applies brakes with a brake pedal 26.

As shown the vehicle is a golf cart, but it is within the scope of the present invention to provide a variety of vehicles with this invention's teachings, including, but not limited to, riding lawnmowers, tractors, forklifts, farm machinery that requires a human operator, and heavy machinery.

The vehicle 10 has battery power apparatus 20 which has one, two, or more batteries 28 which power a motor 30 (shown schematically) and other well-known mechanism for rotating the tires 14.

Releasably secured with connection apparatus 41 and 51, respectively, to the rear roof supports 18 are two fans 40 and 50. A portable power pack 42 provides power via cables 44 for the fans 40 and 50. Optionally one of the fans is deleted. It is to be understood that it is within the scope of the present invention to employ, instead of the fans, an air supply system that will provide a flow of air at the desired location on the vehicle; e.g., but not limited to, a duct or duct with an outlet at the desired location and apparatus associated therewith to propel air through the duct or ducts.

As shown in FIG. 1A, the fan 41 is positioned so that it directs a flow of air at the rear of the head H and at the rear of the neck N of the driver D while also directing air up into a space S beneath the roof 16. Optionally, the fan directs air only at the driver D or only into the space S.

In one particular aspect the portable power pack 42 has a rechargeable lead acid battery or batteries which can be easily carried by a person and which will supply power for a desired time period; e.g., in one particular aspect, sufficient power to power two fans for the time it takes for a typical 18-hole round of golf (e.g. 3 to 5 hours).

Alternatively, or in addition to power from the power pack 42, the fan(s) can be powered by the vehicle's own power supply. In one aspect power is supplied from the battery power apparatus 20 via lines 45, 46 to the power pack 42 and thence to the fans 40, 50; or the fan(s) may be in direct communication with a vehicle power supply. Optionally, a fuse or fuses (e.g. 8 amp/slow fuses) are used between the fans 40, 50 and the power pack 42 (or other power supply).

FIG. 2 illustrates an air system 60 according to the present invention which utilizes two spaced-apart fans 61, 62 mounted beneath a roof 63 of a vehicle (not shown; like the vehicle 10 or any other vehicle disclosed herein with an upper roof or canopy). Each fan is releasably secured with an adjustable clip 64 to a roof mount rod 65; and each fan has been manipulated on position adjustment apparatuses 66 so that they are pointed in a desired direction. As shown the two fans propel air streams which intersect each other creating an area 67 of turbulent air flow beneath the roof 63 to facilitate dissipation of heated air beneath the roof 63. Power is provided to the fans 61, 62 with power cables 68 connected to one or more power supplies (not shown).

The fans 61, 62 may also be directed at a person's head and/or neck while, simultaneously, they direct air beneath the roof 63.

Figure 3A:
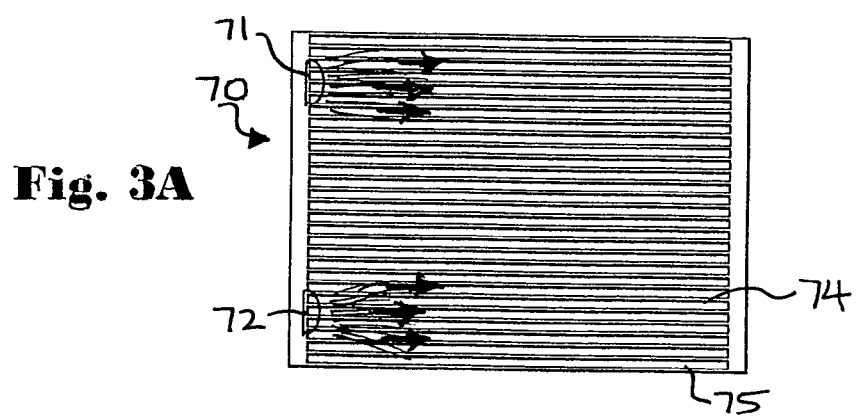
FIG. 3A is a top view of a vehicle roof of a vehicle according to the present invention.
Figure 3B:
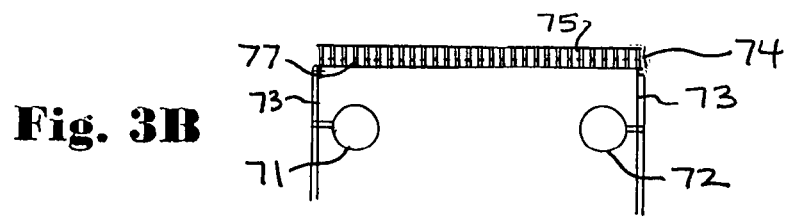
FIG. 3B is an end view of the vehicle of FIG. 3A.

FIGS. 3A and 3B show an air system 70 for a vehicle (like the vehicle 10 or any vehicle disclosed herein) with two spaced-apart fans 71 and 72 (either of which may be deleted). The fans 71, 72 are releasably secured to roof support members 73. A roof 74 supported by roof support members 73 has a plurality of spaced-apart openings 75 through which air is flowable. As shown the openings 75 extend in a generally left-to-right direction in FIG. 3A. The fans 71, 72 are mounted so that they propel air in the direction (indicated by arrows) of direction of the openings 75. Thus, the material of the roof 74 defining the openings provides less blockage to air flow than would openings extending transverse to the air flow.

Any known louvered panel or plate, or venetian-blind type structure may be used for the roof 74 and the openings may be straight through as shown, or slanted. Any desired number of opening(s) may be employed. In one particular aspect a portion 77 of the roof 74 (or of the roof of any vehicle according to the present invention) is made of insulating material, e.g., but not limited to fiberglass, foam, or cellulose insulating material. This insulating material may be on top of or beneath the roof 74.

The present invention, therefore, provides, in at least certain but not necessarily all embodiments, a vehicle with a vehicle body, rotatable apparatus connected to the vehicle body for movement of the vehicle, and an air system connected to the vehicle, the air system for directing a flow of air at the rear of a head of a person occupying the vehicle; and/or a vehicle with a vehicle body, rotatable apparatus connected to the vehicle body for movement of the vehicle, roof mount structure on the vehicle body, a roof on the roof mount structure, and an air system connected to the vehicle for directing a flow of air to an area beneath the roof for dissipating hot air beneath the roof. The present invention, therefore, also provides methods for cooling a person occupying such a vehicle and/or methods for dissipating heat beneath a roof of such a vehicle.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventor may rely on the Doctrine of Equivalents to determine and assess the scope of their invention and of the claims that follow as they may pertain to apparatus not materially departing from, but outside of, the literal scope of the invention as set forth in the following claims. Any patent or patent application referred to herein is incorporated fully herein for all purposes.

What is claimed is:

1. A vehicle comprising
a vehicle body, the vehicle body having a front portion and a rear portion,
rotatable apparatus connected to the vehicle body for movement of the vehicle, and
an air system connected to the vehicle, the air system for directing a flow of air from the rear portion of the vehicle,
the air system comprising two spaced-apart fans connected to the vehicle body and positionable behind the person occupying the vehicle,
a roof and a space beneath the roof, the two spaced-apart fans positioned for directing air into the space beneath the roof to dissipate hot air beneath the roof and positioned so that air flows from each fan intersect creating an area of turbulent air flow beneath the roof in the space beneath the roof, and a power supply for the air system to power the fans.

2. The vehicle of claim 1 wherein the power supply is portable.

3. The vehicle of claim 1 wherein the vehicle has a driver having a head and a neck and the air system and at least one of the fans direct air at a rear of the driver's head and neck.

4. The vehicle of claim 1 wherein the vehicle has two occupants and the two spaced-apart fans include a first fan and a second fan, the fan for directing a flow of air at a first of the two occupants and the second fan for simultaneously directing a flow of air at a second of the two occupants.

5. The vehicle of claim 1 further comprising
roof mount structure on the vehicle body,
a roof on the roof mount structure, and
at least part of the roof made of insulating material.

6. A vehicle comprising
a vehicle body, the vehicle body having a front portion and a rear portion,
rotatable apparatus connected to the vehicle body for movement of the vehicle, and
an air system connected to the vehicle, the air system for directing a flow of air from the rear portion of the vehicle,
the air system comprising two spaced-apart fans connected to the vehicle body and positionable behind the person occupying the vehicle,
a roof and a space beneath the roof,
the two spaced-apart fans positioned for directing air into the space beneath the roof to dissipate hot air beneath the roof and positioned so that air flows from each fan intersect creating an area of turbulent air flow beneath the roof in the space beneath the roof, and
a power supply for the air system to power the fans,
wherein the power supply is portable, and
wherein the vehicle has two occupants and the two spaced-apart fans include a first fan and a second fan, the fan for directing a flow of air at a first of the two occupants and the second fan for simultaneously directing a flow of air at a second of the two occupants.

7. A vehicle comprising
a vehicle body, the vehicle body having a front portion and a rear portion,
rotatable apparatus connected to the vehicle body for movement of the vehicle, and an air system connected to the vehicle, the air system for directing a flow of air from the rear portion of the vehicle,
the air system comprising two spaced-apart fans connected to the vehicle body and positionable behind a person occupying the vehicle,
a roof and a space beneath the roof,
the two spaced-apart fans positioned for directing air into the space beneath the roof to dissipate hot air beneath the roof and positioned so that air flows from each fan intersect creating an area of turbulent air flow beneath the roof in the space beneath the roof,
a power supply for the air system to power the fans,
the roof having at least one elongated opening therethrough, the at least one elongated opening extending in an opening direction along the roof,
the air system further comprising at least one fan mounted to the vehicle beneath the roof at the rear portion of the vehicle body for directing a flow of air to the at least one elongated opening direction.

8. The vehicle of claim 1 wherein the power supply is portable.

9. A method for cooling a person occupying a vehicle, the vehicle comprising a vehicle body, the vehicle body having a front portion and a rear portion, rotatable apparatus connected to the vehicle body for movement of the vehicle, and an air system connected to the vehicle, the air system for directing a flow of air from the rear portion of the vehicle, the air system comprising two spaced-apart fans connected to the vehicle body and positionable behind the person occupying the vehicle, a roof and a space beneath the roof, the two spaced-apart fans positioned for directing air into the space beneath the roof to dissipate hot air beneath the roof and positioned so that air flows from each fan intersect creating an area of turbulent air flow beneath the roof in the space beneath the roof, and a power supply for the air system to power the fans, the method comprising directing air from the fans turbulently into the space beneath the roof.

10. The method of claim 9 wherein the vehicle has two occupants and the two spaced-apart fans include a first fan and a second fan, the first fan for directing a flow of air at a first of the two occupants and the second fan for simultaneously directing a flow of air at a second of the two occupants, the method further comprising directing air at each of the two occupants, at the first occupant with the first fan and at the second occupant with the second fan.

* * * * *